United States Patent [19]

Gorman et al.

[11] Patent Number: 4,476,772
[45] Date of Patent: Oct. 16, 1984

[54] CAGING SEAL FOR HYDRAULIC ELEVATOR OR THE LIKE

[75] Inventors: Gerald W. Gorman, Cedar Hill, Tex.; Walter J. Herrmann, Plumsteadville, Pa.

[73] Assignee: Corbett Elevator Manufacturing Co., Inc., Plumsteadville, Pa.

[21] Appl. No.: 439,065

[22] Filed: Nov. 4, 1982

[51] Int. Cl.³ .............................................. F16J 15/18
[52] U.S. Cl. ....................................... 92/168; 277/58; 277/125; 277/189; 277/205
[58] Field of Search ..................... 92/168; 277/58, 125, 277/189, 205

[56] References Cited

U.S. PATENT DOCUMENTS

| | | | |
|---|---|---|---|
| 1,836,776 | 12/1931 | Shimer | 92/168 |
| 2,692,584 | 10/1954 | Armington et al. | 277/125 |
| 3,172,334 | 3/1965 | Wuellner et al. | 92/168 |
| 3,540,741 | 11/1970 | LeFebure | 92/168 |

FOREIGN PATENT DOCUMENTS 1333774  6/1963  France ................................. 92/168

*Primary Examiner*—Paul E. Maslousky
*Attorney, Agent, or Firm*—Wofford, Fails & Zobal

[57] ABSTRACT

An improvement in a sealing combination for sealing intermediate a cap ring on the hydraulic cylinder or the like and a rod running concentrically therethrough characterized by, in addition to the usual cage assembly on the cylinder assembly, a stuffing box and a wiper ring box for holding respective seals and ring wiper, bearing for maintaining the rod centralized within the central assembly and facilitating longitudinal movement, primary seal disposed about the rod and within the sealing box, a rod wiper disposed about the rod and within the wiper ring box, secondary seal disposed about the rod and intermediate the primary seal and the rod wiper and stop device disposed intermediate the primary seal and the secondary seal and adapted to stop longitudinal movement of the bearing to prevent crushing the second seal. Also disclosed are specific preferred embodiments.

2 Claims, 2 Drawing Figures

U.S. Patent    Oct. 16, 1984    4,476,772
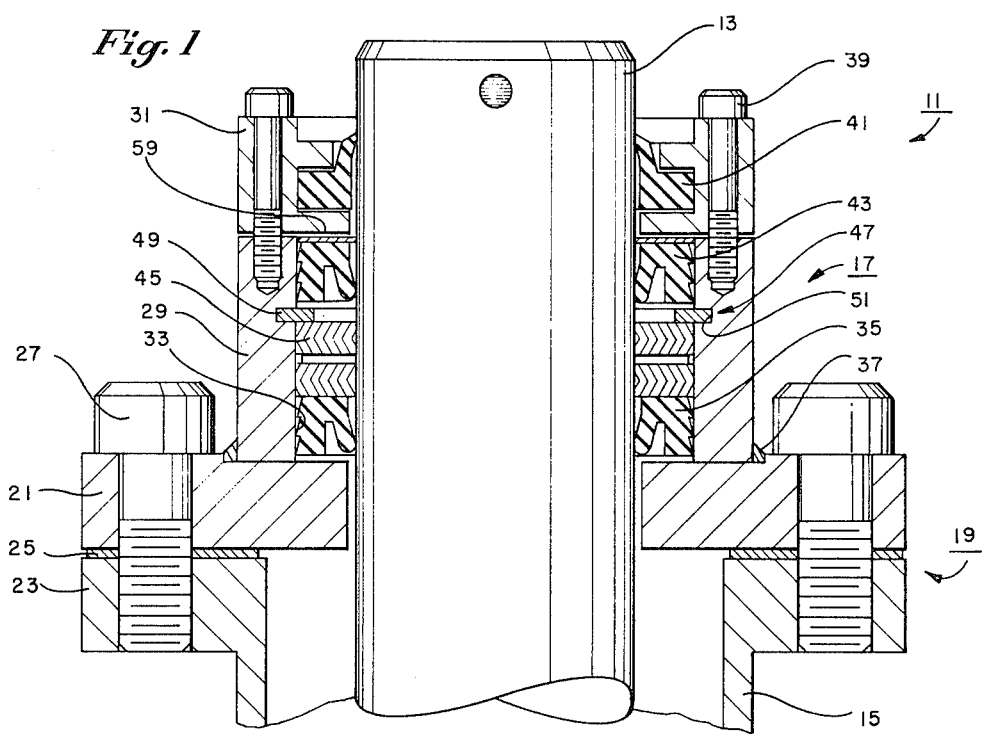
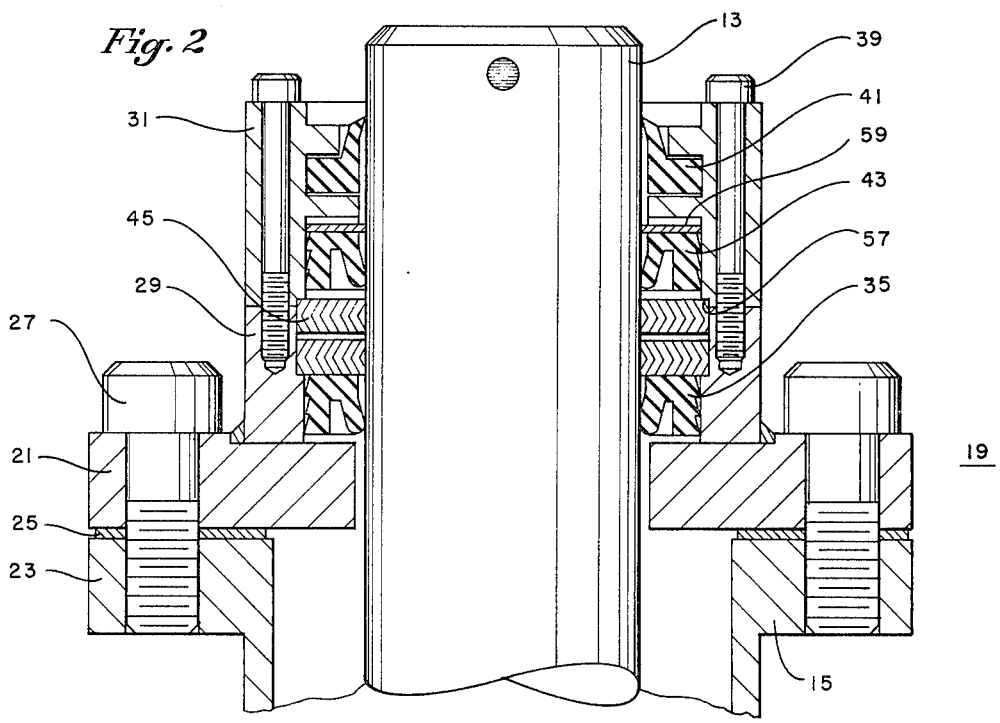

CAGING SEAL FOR HYDRAULIC ELEVATOR OR THE LIKE

BACKGROUND OF THE INVENTION

This invention relates to combinations for sealing about rods traversing longitudinally through the combination. More particularly, this invention relates to a combination for sealing between a longitudinally movable piston rod traversing concentrically interiorly within a cap ring on a hydraulic cylinder assembly or the like; such as used with hydraulic elevators.

DESCRIPTION OF THE PRIOR ART

The prior art has seen the development of a wide variety of fluid seal devices and combinations of the types suitable for use in sealing between a rod and a cylinder under pressure loading conditions. Such prior art seal devices have been subject to a number of disadvantages, including a tendency for early failure due to drawing inwardly of dust, water and the like from adverse exterior environments and to the crushing of secondary seals when they are employed in conjunction with primary seals. In my patent U.S. Pat. No. 3,866,923, I disclosed a sealing rod wiper that was capable of alleviating the problems due to intake of dust, water and the like. Despite this improvement, there was continued problems with the high hydraulic pressure used to move a piston rod longitudinally of the cylinder creating a force so great as to crush secondary seals by a bearing that was employed to centralize the piston rod. This was particularly true where the primary seals were the type such as disclosed in my U.S. Pat. No. 3,554,569 which afforded a dynamic pressure balance seal that had very little leakage.

SUMMARY OF THE INVENTION

Accordingly, it is an object of this invention to provide a combination for sealing intermediate a piston rod and a cylinder assembly that enables using a secondary seal without crushing the secondary seal.

It is a particular object of this invention to provide an improved combination that facilitates the use of both a wiper ring and sealing means, both primary and secondary in respective seal boxes with bearing means without crushing the secondary seal by longitudinal movement of the bearing under the force of the hydraulic pressure on the primary seal.

These and other objects will become apparent from the consideration of the descriptive matter hereinafter, particularly when taken in conjunction with the appended drawings.

In accordance with this invention there is provided a sealing combination for sealing intermediate a cap ring on a hydraulic cylinder or the like and a rod running concentrically therethrough, including
 a. a cylinder assembly;
 b. a piston rod adapted to move longitudinally of the cylinder assembly responsive to hydraulic pressure on its attached piston traversing interiorly of the cylinder;
 c. a head connected with the cylinder assembly and disposed peripherally about the piston rod; and
 d. a cap ring connected with the head for sealingly encompassing the piston rod:
the improvement comprising:
 e. having the cap ring in two parts, a first part comprising a stuffing box and a second part comprising a wiper ring box; the stuffing box being connected with the head, including annular space peripherally exteriorly of the rod and adapted to hold at least a seal means peripherally exteriorly of the rod: the wiper ring box being connected with the stuffing box, including an annular space peripherally exteriorly of the rod and adapted to hold at least a rod wiper peripherally exteriorly of the rod and contiguous the rod;
 f. primary seal disposed peripherally exteriorly of the rod and within the stuffing box;
 g. rod wiper disposed peripherally exteriorly of the rod and within the wiper ring box;
 h. secondary seal disposed peripherally exteriorly of the rod and intermediate the primary seal and the rod wiper;
 i. bearing means disposed peripherally exteriorly of the rod and intermediate the primary seal and the secondary seal for facilitating longitudinal movement of the rod and maintaining the rod centralized within the boxes; and
 j. stop means disposed intermediate the primary seal and the secondary seal and adapted to stop longitudinal movement of the bearing means to prevent crushing the secondary seal.

Specific preferred embodiments are disclosed.

BRIEF DESCRIPTION OF THE DRAWINGS

FIG. 1 is a cross-sectional view of one embodiment of this invention.

FIG. 2 is a cross-sectional view of another embodiment of this invention.

DESCRIPTION OF PREFERRED EMBODIMENTS

Referring to FIG. 1, the combination 11 is illustrated in an embodiment in which a piston rod 13 is caused to move longitudinally through the combination 11 by the cylinder assembly 15 responsive to power by pressurized fluid; for example, high pressure hydraulic fluid (not shown). Expressed otherwise, the sealing combination 11 seals intermediate a cap ring 17 on the hydraulic cylinder assembly 15 with the piston rod 13 running concentrically therethrough. The combination 11 includes, in addition to the cylinder assembly 15 and the piston rod 13, the cap ring 17 and the head 19 disposed peripherally about the piston rod. In the illustrated embodiment, the cylinder assembly, including the piston (not shown) connected with the piston rod moves longitudinally responsive to hydraulic fluid under pressure to move an elevator or the like in response to automatic controls (not shown). Any other environment in which the piston rod is moved responsive to high pressure fluid could use this sealing combination of FIG. 1.

Specifically, the piston rod 13 is simply a cylindrical rod, tubular or solid cross-section, which moves an object responsive to pressurized fluid. It has a smooth cylindrical external surface as indicated to facilitate sealing as it slides reciprocally longitudinally responsive to respective directional pressures in the cylinder assembly 15.

The cylinder assembly 15 comprises the usual conventional cylinder assembly such as a steel cylinder connected by hydraulic hoses, lines and the like and suitable valves and controls with hydraulic pumps and reservoirs in a conventional set up. The cylinder assembly has a head 19 and cap ring 17 sealingly connected therewith for sealing engagement with the piston rod 13.

The head 19 is comprised of top and bottom flanges 21, 23. The top and bottom flanges sealingly engage each other, as by a seal 25. Suitable O-ring seals may be employed intermediate annular longitudinal walls if desired. While the bottom flange is shown as integral with the cylinder walls, it is ordinarily a ring that is slid over the cylinder wall and welded into place. The top flange 21 is connected with the bottom flange by suitable stud bolts 27 although other suitable means can be employed. The stud bolts 27 penetrate through apertures in the annular ring 25 intermediate the top and bottom flanges. As indicated, O-rings may be employed intermediate respective cylindrical inner and outer walls on the flanges, if desired.

The cap ring 17 is sealingly connected with the head 19. In this embodiment, the improvement comprises having the cap ring in two parts, a first part comprising a stuffing box 29 and a second part comprising a wipe ring box 31.

The stuffing box 29 includes an annular space 33 peripherally exteriorly of the rod 13 and adapted to hold a first, or primary, seal means 35 peripherally exteriorly of the rod and sealingly engaging the rod 13. The primary sealing means 35 can be any of the conventional annular sealing means in this art, but is preferably a "dynamic pressure seal device" such as described in my patent of the same title, U.S. Pat. No. 3,554,569. The descriptive matter of that patent is pertinent to the seal 35 and is incorporated herein by reference for details that are omitted herefrom. It is sufficient to note that the seal 35 provides excellent and long lasting seal quality. The seal means 35 is formed of elastomeric material and has an inner cylindrical element defining with respect to an exterior ring an annular cavity for receiving hydraulic pressure from below and expanding into sealing engagement with the piston rod 13 and with the walls of the surrounding cavity of the stuffing box 29. A single seal means has been found adequate to provide suitable sealing, although a plurality of lips may be employed in the external ring. The stuffing box 29 is sealingly affixed to the head, as by welding, shown by weldment 37. In early embodiments, it was thought that this single primary seal means 35 was adequate with a rod wiper in the wiper ring box 31 to do the job.

The wiper ring box 31 is connected with the stuffing box 29 by any conventional means. As illustrated it is connected by studs 39. It includes an annular space exteriorly of the piston rod 13 for holding the wiper ring 41 peripherally exteriorly and sealingly engaging and contiguous the rod 13 for wiping dirt, water and the like therefrom before such contaminants are brought interiorly of the seal means.

Subsequent installations demonstrated, however, that a secondary seal 43 was helpful in preventing hydraulic leaks and the like. The secondary seal 43 is disposed longitudinally intermediate the primary seal means 35 and the rod wiper, or wiper ring, 41. The secondary seal can be any conventional sealing means in this art, but preferably is like the primary seal.

The combination 11 also includes a bearing 45 disposed longitudinally intermediate the primary seal and the rod wiper 41 for maintaining the rod 13 centralized within the boxes 29, 31 and facilitating longitudinal movement of the piston rod 13. In the past, as indicated hereinbefore, there has been a tendency for this bearing to be moved longitudinally responsive to hydraulic force on the primary seal 35 and crush the secondary seal 43. To prevent such crushing, this invention provides a stop means 47.

The stop means 47 is disposed longitudinally intermediate the primary seal 35 and the secondary seal 43 and is adapted to stop longitudinal movement of the bushing 45 and the primary seal 35. Specifically, as illustrated in FIG. 1, the stop means comprises a snap ring 49 such as a C-ring that is slid longitudinally and snapped into engagement with the annular groove 51 in the interior wall of the stuffing box 29. The snap ring is ordinarily made of metal such as steel or the like to be snapped into place and hold with the requisite force to oppose the force of the hydraulic pressure tending to move the bushing longitudinally. The dimensions of the stop ring 49 and the annular groove 51 will depend, of course, on the dimensions of the cylinder assembly and the piston rod as well as the hydraulic pressure that is employed interiorly of the cylinder assembly for moving the elevator through a multiplicity of stories. While metal such as steel is illustrated in the embodiments, any other material that will have adequate strength can be employed.

In operation, the head 19 is affixed to the cylinder assembly 15 in a conventional manner. The stuffing box 29 is affixed to the head in the usual manner. The primary seal 35 and the bearing 45 are emplaced. The snap ring 49 is slid longitudinally and snapped into its groove 51. The secondary seal 43 is then emplaced and the wiper ring box 31, with the rod wiper 41 emplaced, is affixed as by studs 39 to the stuffing box 29. Thereafter, the piston rod 13 is free to move responsive to the hydraulic fluid. The rod wiper, or wiper ring 41, maintains the rod clean adjacent the seals 35, 43 and the bearing 45. Exceptionally long and trouble free service is possible with this combination 11 in accordance with this invention.

Another embodiment is illustrated in FIG. 2. Therein, the respective elements are the same as delineated hereinbefore with respect to FIG. 1. In this embodiment, however, the wiper ring box 31 has a shoulder 57 that stops longitudinal movement of the bearing 45 and prevents its crushing the secondary seal 43. In the embodiment of FIG. 2, the stuffing box 29 is shorter in longitudinal disposition and includes only the primary seal 35 and the bearing 45; whereas, in FIG. 1, it also included the annular groove 51, the snap ring 49 and the secondary seal 43, as well as its cover plate 59. In the embodiment of FIG. 2, however, the secondary seal 43 and the cover plate 59 are emplaced in the annular space intermediate the interior wall of the wiper ring box 31 and the piston rod 13. It is relatively immaterial which box has respective shoulders. The illustrated embodiments are those which are most economical to prepare and assemble and hence are the preferred embodiments and are the ones shown for that reason.

The operation of the embodiment of FIG. 2 is essentially the same as described hereinbefore with respect to the embodiment of FIG. 1; except there is no need to snap the snap ring 49 into the groove 51, since the shoulder 57 is integrally formed with the wiper ring box so as to contain the bearing 45 and inhibit its longitudinal movement to crush the secondary seal 43.

From the foregoing it can be seen that this invention achieves the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention, a reference for the latter being had to the appended claims.

What is claimed is:

1. In a sealing combination for sealing intermediate a cap ring of a hydraulic cylinder assembly or the like and a rod running concentrically therethrough, including:

said rod adapted to move longitudinally of said cylinder assembly responsive to hydraulic pressure applied to a piston attached to said rod and traversing interiorly of said cylinder assembly;

said cylinder assembly including a head disposed peripherally about said rod, and the cap ring connected with said head for sealingly encompassing said piston rod;

the improvement comprising:

having said cap ring in two parts, the first part comprising a stuffing box and a second part comprising a wiper ring box; said stuffing box being connected with said head, including an annular space peripherally exteriorly of said rod; rod and adapted to hold seal means peripherally exteriorly of said rod; said wiper ring box being connected with said stuffing box, including an annular space peripherally exteriorly of said rod and adapted to hold at least a rod wiper peripherally exteriorly of said rod and contiguous said rod;

said seal means including a primary seal disposed peripherally exteriorly of said rod and within said stuffing box;

said rod wiper disposed peripherally exteriorly of said rod and within said wiper ring box;

said seal means, also, including a secondary seal disposed peripherally exteriorly of said rod, within said stuffing box, and intermediate said primary seal and said rod wiper;

bearing means disposed peripherally exteriorly of said rod, within said stuffing box, and intermediate said primary seal and said secondary seal for facilitating longitudinal movement of said rod and maintaining said rod centralized within said boxes; and stop means disposed intermediate said primary seal and bearing means, and said secondary seal; said stop means dividing the annular space peripherally exteriorly of said rod in said stuffing box so as to define respective annular chamber spaces for said primary seal and said secondary seal with an annular space between said primary and secondary seals; and said stop means being adapted to stop longitudinal movement of said bearing means to prevent crushing said secondary seal and prevent rendering said secondary seal ineffective to form said annular space between said primary and secondary seals.

2. The combination of claim 1 wherein said stop means comprises a snap ring disposed in an annular groove in said stuffing box of said cylinder assembly and intermediate said bearing and said secondary seal.

* * * * *